Patented Sept. 13, 1932

1,876,973

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

SUBSTITUTION PRODUCTS OF ANTHANTHRONES

No Drawing. Application filed February 23, 1929, Serial No. 342,297, and in Germany July 28, 1928.

The present invention relates to the production of dyestuffs and intermediate products for the preparation of dyestuffs by replacing the amino groups of amino-anthanthrones by other radicals.

We have found that uniform products which are partly dyestuffs themselves and partly valuable intermediate products for the preparation of dyestuffs are obtained by diazotizing the amino group or groups of mono- or polyaminoanthanthrones and replacing the diazo group or groups by halogen, hydroxy, carboxylic, cyano, mercapto, thiociano group or groups.

The aminoanthanthrones employed as initial materials according to our invention may be obtained by reducing the corresponding nitro derivatives of which the mononitro compounds are obtainable according to the process described in the copending application Ser. No. 341,056, filed February 18, 1929, by the action of nitric acid on anthanthrones in a solvent of high boiling point, whereas the polynitrocompounds, i. e. the di-, tri- and tetranitro derivatives are obtainable by direct nitration of anthanthrones with strong nitric acid or a mixture of sulfuric and nitric acids, or by nitrating 1.1′-dinaphthyl-8.8′- or -2.2′-dicarboxylic acid or derivatives thereof and condensing the products with the aid of acid condensing agents.

Valuable vat dyestuffs are obtained from anthanthrones substituted by oxygen containing radicals, viz. hydroxy or carboxylic groups, obtained in the aforesaid manner, by etherifying or esterifying the said groups. Thus, for instance, by the action of dimethylsulfate, the aliphatic or aromatic esters of p-toluenesulfonic acid, for example the methyl, ethyl, ethylene, chlorethylene, phenol and like esters, hydroxy-anthanthrone ethers are produced, which dissolve to green solutions in concentrated sulfuric acid and dye cotton excellently fast, weatherproof yellow red to red blue shades from violet vats. The said ethers form red needles melting above 360° C.

The following examples further illustrate the nature of the said invention which however is not limited thereto. The parts are by weight.

Example 1

33.6 parts of diamino anthanthrone are dissolved in concentrated sulfuric acid and diazotized in the usual manner with a solution of $N_2O_3$ in sulfuric acid or with a nitrate. The solution of the diazo sulfate obtained is heated at from 90° to 100° centigrade while stirring, whereby nitrogen is evolved and the initial red coloration of the solution is changed to a green coloration. After cooling, the whole is poured onto ice, and the product filtered off by suction and dried. The dihydroxyanthanthrone obtained corresponding to the formula:

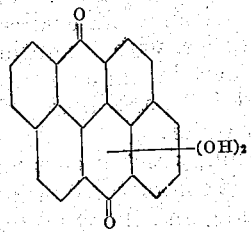

dissolves in concentrated sulfuric acid with a blue green coloration and gives dyeings on cotton which are not fast against alkali. By etherification of the hydroxyl groups, for example with aliphatic esters of p-toluene sulfonic acid, dialkoxyanthanthrones are obtained which are dyestuffs having excellent properties and which dye cotton in blue red shades.

Example 2

33.6 parts of diamino anthanthrone are dissolved in 300 parts of sulfuric acid and diazotized in the usual manner with a solution of $N_2O_3$ in concentrated sulfuric acid, or with a nitrite. The diazosulfate obtained is treated either directly, or after dilution with ice, with a solution of 70 parts of potassium iodide in water while stirring. Diiodoanthanthrone of the formula:

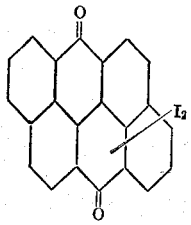

is formed with evolution of nitrogen. The reaction is completed by heating to 70° centigrade and the reaction product is filtered off by suction and dried. The di-iodo derivative is obtained in the form of a violet powder, which dissolves in concentrated sulfuric acid giving a green coloration. The purification of the product may be carried out by crystallization from organic solvents of high boiling point such as nitrobenzene or by way of the sulfate which separates out from aqueous sulfuric acid. The new dyestuff dyes cotton fast blue red shades from a violet vat.

The corresponding dichloro or dibromoanthanthrones may be obtained in an analogous manner by employing cuprous chloride or cuprous bromide instead of potassium iodide. The pure dibromo derivative obtained in this manner gives very fast orange red shades from a red violet vat.

*Example 3*

33.6 parts of diaminoanthanthrone are diazotized in sulfuric acid in the usual manner and the diazosulfate thus obtained is converted into dicyananthanthrone by treatment, while stirring, either directly, or after dilution with ice, with a solution of cuprous cyanide, prepared from 52 parts of potassium cyanide and 100 parts of copper sulfate in 300 parts of water.

The reaction, which occurs with evolution of nitrogen, is completed by heating to about 70° centigrade, and the reaction product filtered off by suction and dried. The dicyan anthanthrone obtained of the formula:

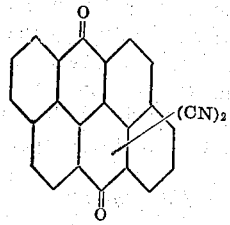

is a violet powder which dissolves in concentrated sulfuric acid giving a blue violet coloration. It may be purified as described in Example 6 and may be employed as an initial material for the preparation of new anthanthrone derivatives.

*Example 4*

32 parts of monoaminoanthanthrone obtainable by reducing mononitroanthanthrone, prepared by nitrating anthanthrone in nitrobenzene, are dissolved in sulfuric acid and diazotized in the usual manner with a solution of $N_2O_3$ in concentrated sulfuric acid or with a nitrite. The solution of diazosulfate obtained of the formula:

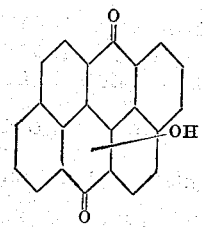

is heated to between 80° and 90° centigrade, while stirring, whereby monohydroxyanthanthrone is formed with the evolution of nitrogen. When the coloration of the solution has changed from red violet to green the reaction is complete. After cooling and diluting the reaction mass with ice, the monohydroxyanthanthrone is filtered off by suction and dried and is thus obtained in the form of a red brown powder which dissolves to give a green solution in concentrated sulfuric acid, and which dissolves in a solution of caustic alkali to give a blue green solution, and which can be precipitated from the alkaline solution in the form of violet red flakes by the addition of an acid.

*Example 5*

32 parts of the monohydroxyanthanthrone obtained according to the foregoing example are heated to boiling with 52 parts of the methyl ester or p-toluene sulfonic acid and 45 parts of potash and 30 times the amount of trichlor or nitro-benzene until the formation of the dyestuff is complete which may be recognized by the appearance of a yellow green fluorescence. The reaction mixture is best worked up by filtering the hot solution by suction, the monomethoxyanthanthrone of the formula:

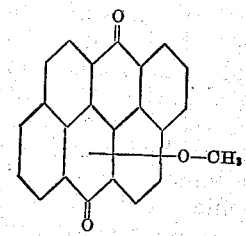

separating from the filtrate in the form of a red crystalline deposit. The dyestuff obtained dissolves in concentrated sulfuric acid to give a pure green solution and recrystallizes from organic solvents having a high boiling point in the form of red needles and produces very fast red shades on cotton from a red vat.

Example 6

32 parts of monoamionanthanthrone are diazotized as described in Example 8 and the diazosulfate obtained is converted into monocyanoanthanthrone either directly or after dilution with ice by stirring with a solution of cuprous cyanide (obtained from 75 parts of copper sulfate, 8 parts of potassium cyanide and 50 parts of water). The reaction is completed by warming to about 70° centigrade, while stirring, until nitrogen is no longer evolved and the reaction product is then filtered off by suction and dried. The monocyanoanthanthrone of the formula:

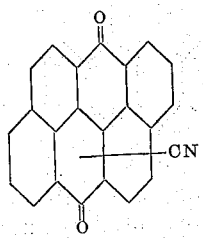

is a brown yellow powder which dissolves in concentrated sulfuric acid to give a blue green solution and gives a violet red vat with alkaline hydrosulfite from which cotton is dyed yellow shades. It recrystallizes from organic solvents having a high boiling point in the form of long yellow needles. If cuprous thiocyanate be employed instead of cuprous cyanide, monothiocyanoanthanthrone of similar properties is obtained in an analogous manner.

Example 7

5 parts of the monocyanoanthanthrone obtained according to the foregoing example are heated with 50 parts of caustic potash and 100 parts of alcohol to between 140 and 150 degrees centigrade while stirring until a sample dissolves in a solution of caustic alkali to give a red yellow solution. The melt is taken up in water, air is passed through the solution, and the solution is then acidified. The anthanthrone monocarboxylic acid thus formed corresponding to the formula:

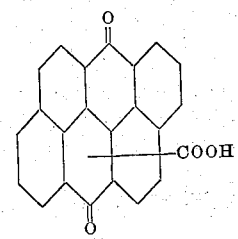

can be purified by dissolving it in a solution of caustic alkali and precipitating it therefrom by means of an acid. The said carboxylic acid crystallizes from organic solvents having a high boiling point in the form of lustrous red yellow needles which dissolve in sulfuric acid to give a green solution.

The monocyanoanthanthrone can be transformed into the carboxylic acid equally well in an acid medium, for example in sulfuric acid.

Example 8

32 parts of monoaminoanthanthrone are diazotized as described in Example 8. The diazosulphate thus obtained is converted into monobromanthanthrone either directly or after dilution with ice by means of a solution of 15 parts of cuprous bromide in 300 parts of hydrobromic acid. The reaction is completed by warming to about 70° centigrade until nitrogen is no longer evolved and the reaction product is then filtered off by suction and dried. The monobromanthanthrone obtained corresponding to the formula:

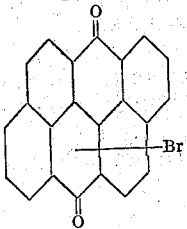

is a brown powder which dissolves in concentrated sulfuric acid to give a green solution and gives a violet red vat with alkaline hydrosulfite from which cotton is dyed orange yellow shades. The product may be purified by recrystallization from organic solvents having a high boiling point, such as nitrobenzene, or by decomposing the sulfate which separates from aqueous sulfuric acid.

Example 9

Monoaminoanthanthrone dissolved in concentrated sulfuric acid is diazotized at ordinary temperature in the usual manner by means of a solution of nitrosyl sulfuric acid in sulfuric acid or by means of a nitrite and the diazosulfate solution thus obtained is converted into monoiodoanthanthrone either directly or after dilution with ice by the addition of the calculated amount of potassium iodide dissolved in water while stirring, the said iodo-derivative separating out in the form of fine crystals. The reaction is completed by warming to about 70° centigrade while stirring and the reaction product is then filtered off by suction and dried. The monoiodoanthanthrone corresponding to the formula:

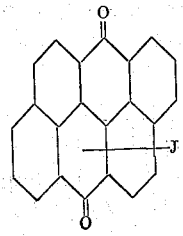

is a brown powder which dissolves in concentrated sulfuric acid to give a green solution and gives a violet red vat with alkaline hydrosulfite from which cotton is dyed orange shades. The dyestuff may be purified by crystallization from organic solvents having a high boiling point such as nitrobenzene or by decomposing the sulfate deposited by diluting the sulfuric acid solution of the dyestuff with water.

*Example 10*

32 parts of monohydroxyanthanthrone obtainable according to Example 8 are heated to boiling, while stirring, with 58 parts of the ethyl ester of p-toluene sulfonic acid and 45 parts of potash in 25 times the amount of the ester employed of trichlorobenzene, until the formation of the dyestuff is complete which may be recognized by the appearance of a yellow green fluorescence of the reaction mixture, which is then worked up as usual. The dyestuff obtained in the form of red crystals dissolves to a green solution in concentrated sulfuric acid and dyes cotton very fast red shades from a red vat. It has the following formula:

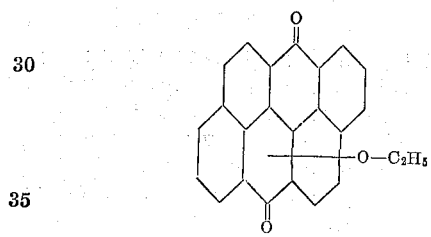

*Example 11*

32 parts of the monohydroxyanthanthrone obtainable according to Example 8, are boiled for 5 hours, while stirring, with 60 parts of the omega-chloroethyl ester of p-toluene sulfonic acid and 45 parts of potash in 25 times the amount of the ester employed of nitrobenzene. The reaction mixture is worked up as usual. The dyestuff thus obtained is a red crystalline powder dissolving to a green solution in concentrated sulfuric acid, and dyes cotton clear, red shades of good fastness properties from a red vat. The dyestuff has the following formula:

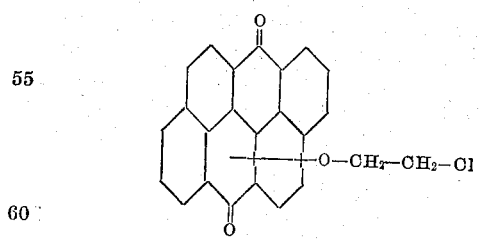

What we claim is:—

1. As new articles of manufacture uniform derivatives of the anthanthrone series corresponding to the general formula:

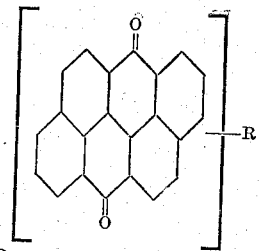

in which R stands for a hydroxy (which may be etherified or esterified), carboxylic, cyano, thio-cyano or mercapto group.

2. As new articles of manufacture uniform derivatives of the anthanthrone series corresponding to the general formula:

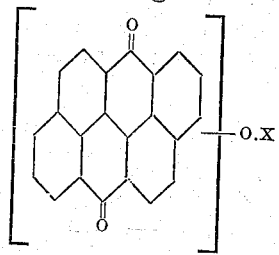

in which X stands for a hydrocarbon radical which may be substituted by halogen.

3. As new articles of manufacture uniform derivatives of the anthanthrone series corresponding to the general formula:—

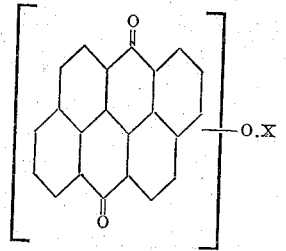

in which X stands for an aliphatic hydrocarbon radical which may be substituted by halogen.

4. As a new article of manufacture the vat dyestuff corresponding to the formula:—

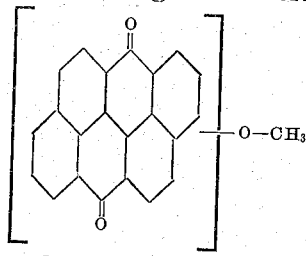

forming a red crystalline powder dissolving to a green solution in concentrated sulfuric acid and dyeing cotton from a red vat clear, red shades.

In testimony whereof we have hereunto set our hands.

MAX ALBERT KUNZ.
KARL KOEBERLE.
ERICH BERTHOLD.